(12) United States Patent
Marinescu

(10) Patent No.: US 9,463,679 B2
(45) Date of Patent: Oct. 11, 2016

(54) CAMBER ADJUSTMENT APPARATUS AND METHOD

(71) Applicant: Alin Marinescu, Edmonton (CA)

(72) Inventor: Alin Marinescu, Edmonton (CA)

( * ) Notice: Subject to any disclaimer, the term of this patent is extended or adjusted under 35 U.S.C. 154(b) by 0 days.

(21) Appl. No.: 14/696,943

(22) Filed: Apr. 27, 2015

(65) Prior Publication Data

US 2015/0307132 A1    Oct. 29, 2015

Related U.S. Application Data

(60) Provisional application No. 61/985,072, filed on Apr. 28, 2014.

(51) Int. Cl.
*B62D 17/00* (2006.01)
*B60G 21/00* (2006.01)

(52) U.S. Cl.
CPC ......... *B60G 21/007* (2013.01); *B60B 2340/52* (2013.01)

(58) Field of Classification Search
CPC .. B60G 21/007; B62D 17/00; B60B 2340/52
USPC .................................................. 280/86.751
See application file for complete search history.

(56) References Cited

U.S. PATENT DOCUMENTS

| | | | | | |
|---|---|---|---|---|---|
| 3,199,837 | A * | 8/1965 | Vestal | ................. | B25B 27/0035 254/1 |
| 3,357,661 | A * | 12/1967 | Aakjar | .................... | F16B 5/025 248/662 |
| 4,424,697 | A * | 1/1984 | Carver | ................... | B62D 17/00 72/309 |
| 7,475,890 | B1 * | 1/2009 | Kern | .................... | B25B 27/0035 280/86.751 |
| 7,914,020 | B2 * | 3/2011 | Boston | ...................... | B60G 3/20 280/124.136 |
| 8,333,015 | B2 * | 12/2012 | Merrill | ..................... | B60G 9/00 280/86.751 |
| 8,398,092 | B2 * | 3/2013 | Lee | ...................... | B60G 17/025 280/5.507 |
| 2005/0110228 | A1 * | 5/2005 | Fujimori | .............. | B60G 17/025 280/5.511 |
| 2014/0361504 | A1 * | 12/2014 | Khoury | ................. | B60B 35/004 280/86.75 |
| 2015/0054244 | A1 * | 2/2015 | Seo | ...................... | B60G 15/068 280/86.752 |

* cited by examiner

*Primary Examiner* — James English
(74) *Attorney, Agent, or Firm* — Cowan, Liebowitz & Latman, P.C.; Mark Montague

(57) ABSTRACT

A camber adjustment apparatus is provided for alignment of a vehicle wheel. The camber adjustment apparatus includes: a plate member configured to be bolted to the vehicle wheel; an adjuster plate member coupled to a bottom surface of the plate member and comprising a first end and a second end; an adjuster bolt coupled to the first end and the second end of the adjuster plate member; and an adjusting body movably coupled to the adjuster bolt and at least partially disposed between the first end and the second end of the adjuster plate member. The adjusting body is configured so that rotation of the adjuster bolt moves the adjusting body between the first end and the second end of the adjuster plate member such that the plate member is adjusted to a predetermined camber.

19 Claims, 5 Drawing Sheets

CAMBER ADJUSTMENT APPARATUS AND METHOD

REFERENCE TO RELATED APPLICATION

This application claims priority to U.S. Provisional Patent Application No. 61/985,072, filed with the U.S. Patent and Trademark Office on Apr. 28, 2014, the entire content of which is incorporated herein by reference.

BACKGROUND OF THE INVENTION

1. Field of the Invention

The present invention relates generally to a camber, toe, and caster adjustment apparatus and method, and more particularly, to a camber adjustment apparatus and method for alignment of vehicle wheels.

2. Description of the Related Art

Camber angle, referred to as camber in the automotive trade, is the variance in degrees measured between true vertical and that of the measured vertical axis of a wheel. Camber, in combination with suspension design and other wheel alignment specifications, is tuned to meet a user's desired vehicle handling, performance and tire wear requirements. To keep a vehicle's wheels properly aligned for optimized handling, performance and tire wear attributes, wheel alignment is performed from time to time. In performance vehicles, proper camber is necessary as mis-alignment of camber leads to an increase in tire temperature at high speeds, especially in turns, making the tires more susceptible to damage due to improper contact with the ground and resulting in inadequate contact between the tire and the road.

In a race car pit, a user measures camber, toe and caster of a wheel and adjusts the vehicle's suspension to tune the wheel to the desired camber, toe, and caster while the vehicle is on the ground. The user then repeats camber, toe, and caster measurement and suspension adjustment for the other wheel on the same axle of the vehicle to match the desired camber, toe, and caster. The vehicle's wheel is generally removed to provide convenient access to the vehicle's suspension during adjustment. When the wheel is replaced, camber is again measured by the user to ensure that the adjustment achieved the desired camber, toe and caster.

Under non-racing conditions, the vehicle is placed on a hydraulic lift to perform camber adjustment. After the suspension is tuned, the wheel is reinstalled and the vehicle is lowered to the ground to measure camber of the wheels. Camber adjustment using this method generally leads to adjustment errors of 0.5-1.0 degrees in the negative or positive direction. Such an error in wheel alignment leads to a decline in vehicle handling, performance and tire wear. In performance vehicle usage under, for example, racing conditions, the vehicle cannot be placed on a hydraulic lift due to time constraints.

A conventional device used in the automotive arts for on-the-ground camber adjustment is known as a hub-stand. The hub-stand bolts onto a vehicle's wheel hub in place of a wheel and allows a user to adjust the vehicle's suspension. The hub-stand replaces the wheel, allowing for convenient access to the vehicle's suspension system, but includes no functionality related to correctly adjusting camber, toe and caster. Thus, when the wheel is reinstalled, the user experiences difficulty in having the same camber set-up as with the hub-stands installed.

SUMMARY OF THE INVENTION

Accordingly, an embodiment provides a camber adjustment apparatus for alignment of a vehicle wheel. The camber adjustment apparatus comprises: a plate member configured to be bolted to the vehicle wheel; an adjuster plate member coupled to a bottom surface of the plate member and comprising a first end and a second end; an adjuster bolt coupled to the first end and the second end of the adjuster plate member; and an adjusting body movably coupled to the adjuster bolt and at least partially disposed between the first end and the second end of the adjuster plate member. The adjusting body is configured so that rotation of the adjuster bolt moves the adjusting body between the first end and the second end of the adjuster plate member such that the plate member is adjusted to a predetermined camber.

According to further embodiments: the predetermined camber of the plate member is adjusted in a direction of negative or positive camber based on a position of the adjusting body with respect to the first end and the second end of the adjuster plate member; the adjusting body comprises a wheel that contacts a supporting surface, and wherein the camber adjustment apparatus pivots about the wheel when the adjuster bolt moves the adjusting body between the first end and the second end; the plate member comprises a first plate member comprising an upper portion, a lower portion, a front surface, and a rear surface and a second plate member coupled to the lower portion of the first plate member comprising a front member, a rear member, and a securing bolt protruding through the front member to the rear member; at least a portion of the first plate member is disposed between the front member and the rear member of the second plate member; the first plate member is adjustably coupled to the front member and the rear member of the second plate member; at least one lug hole is disposed on the upper portion of the first plate member and extending through the front surface and the rear surface of the first plate member; instrument mounting members are disposed on the upper portion of the first plate for removably mounting camber measuring instruments; a first adjuster bolt securing member is coupled to a bottom surface of the first end of the adjuster plate member and a second adjuster bolt securing member is coupled to a bottom surface of the second end of the adjuster plate member; the adjuster bolt is rotatably coupled to the first adjuster bolt securing member and the adjuster bolt is rotatably coupled to the second adjuster bolt securing member; the adjusting body is disposed between the first adjuster bolt securing member and the second adjuster bolt securing member; and a position of the adjusting body between the first adjuster bolt securing member and the second adjuster bolt securing member is adjusted by rotating the adjuster bolt.

An additional embodiment provides a camber adjustment system. The camber adjustment system comprises: a vehicle comprising at least one wheel hub coupled to an axle; a camber adjustment apparatus bolted to the wheel hub, the camber adjustment apparatus comprising: a plate member configured to be bolted to the vehicle wheel; an adjuster plate member coupled to a bottom surface of the plate member and comprising a first end and a second end; an adjuster bolt coupled to the first end and the second end of the adjuster plate member; and an adjusting body movably coupled to the adjuster bolt and at least partially disposed between the first end and the second end of the adjuster plate member. The adjusting body is configured so that rotation of the adjuster bolt moves the adjusting body between the first end and the second end of the adjuster plate member such that the plate member is adjusted to a predetermined camber.

According to further embodiments: the camber adjustment apparatus comprises a first camber adjustment apparatus and a second camber adjustment apparatus coupled to opposite ends of the axle; an instrument is mounted to the plate member for measuring at least one of camber, toe, and caster; and the plate member comprises a plurality interchangeable plate members comprising lug holes for mounting the camber adjustment apparatus to the wheel hub, wherein the lug holes comprise at least one of a three, four, five and six hole pattern.

An additional embodiment provides a method of adjusting camber of a wheel hub of a vehicle. The method of adjusting camber comprises: providing a camber adjustment apparatus comprising a plate member configured to be bolted to the vehicle wheel, an adjuster plate member coupled to a bottom surface of the plate member and comprising a first end and a second end, an adjuster bolt coupled to the first end and the second end of the adjuster plate member, and an adjusting body movably coupled to the adjuster bolt and at least partially disposed between the first end and the second end of the adjuster plate member; securing the camber adjustment apparatus to the wheel hub of the vehicle; and rotating, in at least one of a clockwise and a counterclockwise direction, the adjuster bolt until the wheel hub of the vehicle is set to a predetermined camber.

According to further embodiments: when the adjuster bolt is rotated, the plate member is adjusted in a direction of negative or positive camber based on a position of the adjusting body with respect to the first end and the second end of the adjuster plate member; adjusting a position of the plate member with respect to the adjuster plate member such that a height of the camber adjustment apparatus corresponds to a predetermined height of the wheel hub; and determining relative camber of the camber adjustment apparatus from a camber measurement scale disposed on a sidewall of the adjuster plate member.

BRIEF DESCRIPTION OF THE DRAWINGS

The above and other aspects, features and advantages of certain embodiments will be more apparent from the following detailed description taken in conjunction with the accompanying drawings, in which.

DETAILED DESCRIPTION OF THE PRESENT INVENTION

The following detailed description of certain embodiments will be made in reference to the accompanying drawings. In the detailed description, explanation of related functions or constructions known in the art are omitted for the sake of clearness in understanding the concept of the invention and to avoid obscuring the invention with unnecessary detail.

Figure 1:
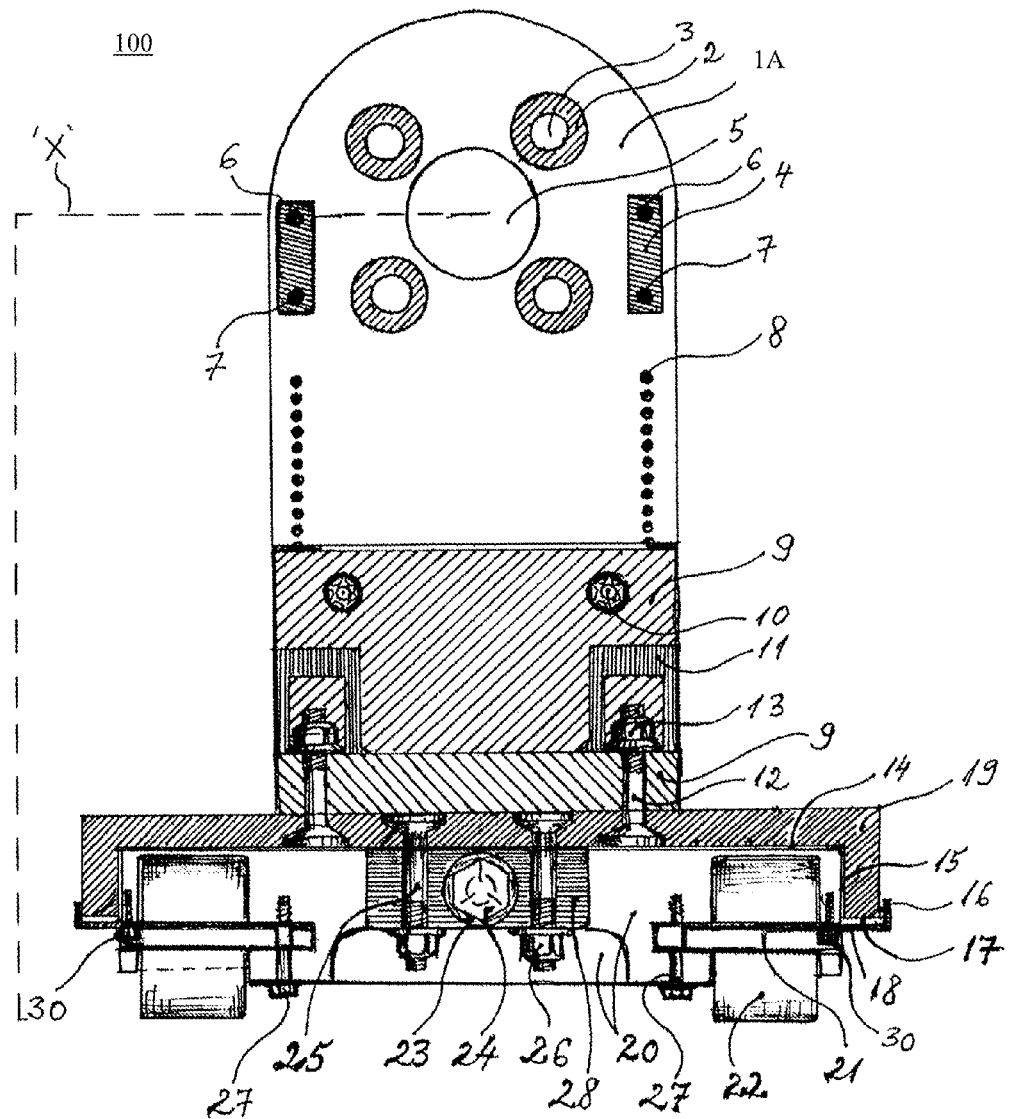
FIG. 1 illustrates a front view of a camber adjustment apparatus.

FIG. 1 illustrates a front view of a camber adjustment apparatus 100. The camber adjustment apparatus 100 includes a first plate member 1A. The first plate member 1A includes an upper portion, a lower portion, a front surface, and a rear surface. As further described below, the first plate member 1A is configured to be bolted to a wheel hub of a vehicle. The first plate member 1A includes a top rounded surface that substantially corresponds to the size and shape of the wheel hub. When mounted to the wheel hub, the first plate member 1A is smaller in size than a wheel. A user of the camber adjustment apparatus 100 is therefore able to conveniently access the vehicle's suspension when the camber adjust apparatus is coupled to the wheel and the vehicle is on the ground. The vehicle's suspension cannot be easily accessed when a vehicle is on the ground and the wheel is attached to the wheel hub unless the vehicle is raised up on a lift.

The upper portion of the first plate member 1A includes lug holes 3, a bore hole 5 and instrument mounting members 4. The bore 5 may be disposed in a vertically centered portion of the upper portion and in a horizontally centered portion with respect to the first plate member 1A. As indicated by the dotted line labeled 'X', a radius of a wheel of a vehicle is substantially equal to the distance from a center of the bore 5 to the ground. The instrument mounting members 4 are disposed on the upper portion and, as indicated by line 'X' between upper holes 6 of the mounting members 4, horizontally overlap at least a portion of the center of the bore 5. Each of the instrument mounting members 4 are disposed along a peripheral edge of the first plate member 1A, with the lug holes 3 and bore 5 disposed between the instrument mounting members 4. Various camber measuring instruments can be removably mounted on the instrument mounting members 4 to measure camber, toe, or caster of the wheel. The bore 5 is used for clearing the camber adjustment apparatus 100 from the center of the wheel hub flange extension disposed at the center of the wheel hub.

Figure 2:
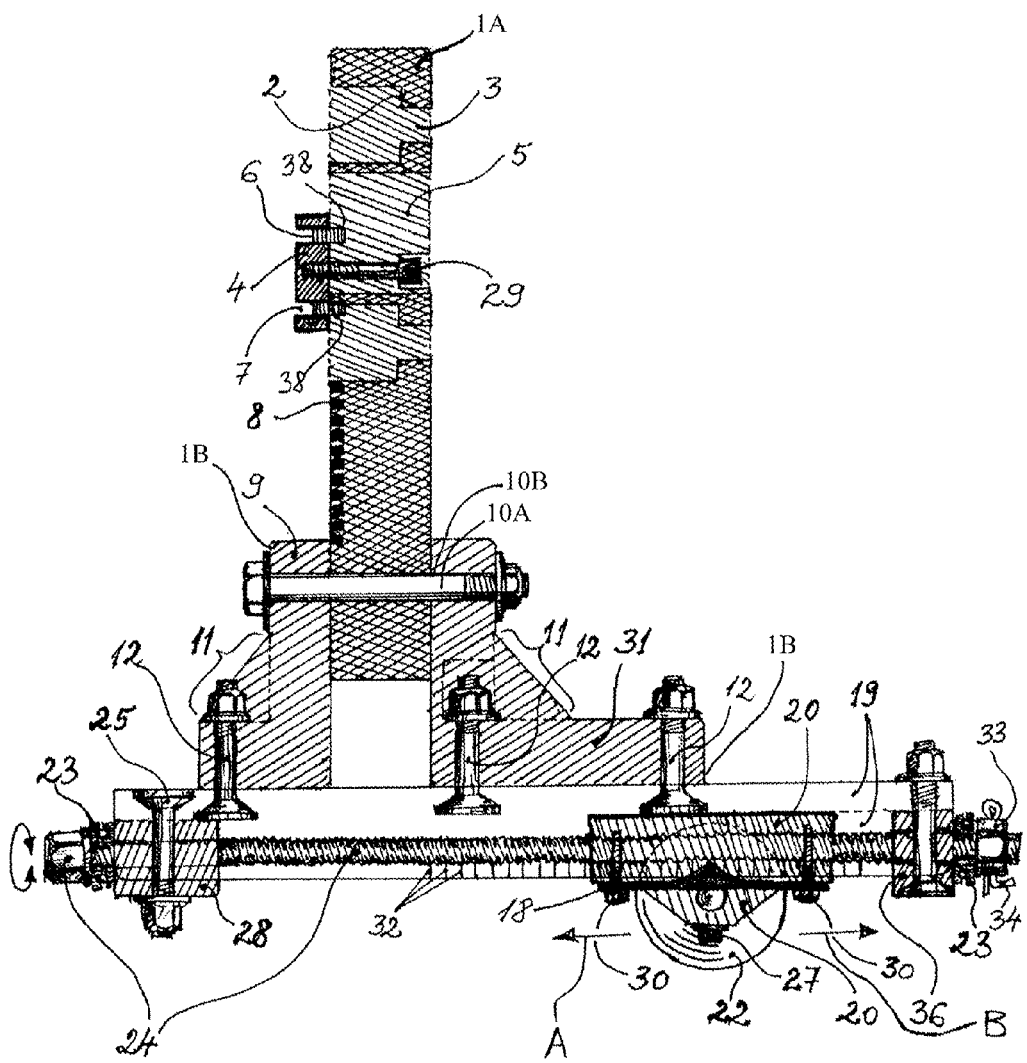
FIG. 2 illustrates a side view of the camber adjustment apparatus.

The instrument mounting members 4 include upper instrument holes 6 and lower instrument holes 7. The instrument holes 6 and 7 may be threaded or unthreaded. The instrument holes 6 and 7 are used to mount camber, toe, and caster measuring instruments on the instrument mounting members 4. The instrument mounting members 4 include an instrument mounting member securing screw 29, as illustrated in FIG. 2, that is inserted through the rear surface of the first plate member 1A and secures the instrument mounting members 4 to the front surface of the first plate member 1A. The securing screw 29 is inserted into a securing screw hole. A recessed portion surrounds the securing screw hole, allowing the securing screw 29 to be flush with the rear surface of the first plate member 1A when fully inserted.

Locating dowels 38 are inserted into the holes 6 and 7. The locating dowels 38 position the instrument mounting members 4 on the front surface of the first plate member 1A and prevent the instrument mounting members 4 from shifting and/or twisting. A center of the holes 6 is horizontally aligned with the center of the bore 5.

The camber adjustment apparatus 100 is bolted to a wheel hub of a vehicle by inserting bolts through the lug holes 3. The lug holes 3 include may be provided in at least one of a three, four, five and six hole pattern equally distributed around the bore 5. The lug hole pattern may be selected depending on the wheel hub of the vehicle. The first plate member 1A may be removably coupled to a second plate member 1B, as further described below, so that multiple interchangeable plates with various lug hole configurations may be exchanged for each other. Thus, the camber adjustment apparatus 100 may be used with any lug hole pattern. The lug hole 3 includes a recessed portion 2 that is larger than a nut so that a socket or wrench may be used to screw the bolt into the lug hole 3. The recessed portion 2 also allows a head of the bolt to be flush with a front surface of the first plate member 1A when the camber adjustment apparatus 100 is mounted to the vehicle's wheel hub. Also, in certain applications, the bore 5 can be used as the sole center mounting hole, for mounting the camber adjustment apparatus 100 using a single bolt and nut.

Multiple instrument mounting holes 8 are disposed on edges of the lower portion of the front surface of the first plate member 1A. The mounting holes 8 may also be disposed on the rear surface of the first plate member 1A and/or a side surface of the first plate member 1A. The instrument mounting holes 8 may be threaded or unthreaded. The instrument mounting holes 8 are used to removably mount camber, toe, and caster measuring instruments to the first plate member 1A.

FIG. 2 illustrates a side view of a camber adjustment apparatus 100. The camber adjustment apparatus 100 includes a second plate member 1B coupled to the lower portion of the first plate member 1A. The second plate member 1B includes a front member 9 and a rear member 31. The second plate member 1B includes a securing bolt 10A extending through the front member 9 and the first plate member 1A to the rear member 31. At least a portion of the lower portion of the first plate member 1A is disposed between the front member 9 and the rear member 31. The front member 9 is disposed a distance away from the rear member 31 of at least the thickness of the lower portion of the first plate member 1A. An open space is left below the first plate member 1A and between the front member 9 and the rear member 31 when the first plate member 1A is raised off a top surface of an adjuster plate member 19. A surface of the first plate member 1A is perpendicularly oriented with respect to a surface of the adjuster plate member 19.

The securing bolt 10A protrudes in parallel to the surface of the adjuster plate member 19 through a securing bolt hole 10B disposed on the lower portion of the first plate member 1A, securing the first plate member 1A between the front member 9 and the rear member 31. The first plate member 1A may be adjustably coupled to the second plate member 1B and may include multiple securing bolt holes arranged vertically to allow the user to adjust the position of the first plate member 1A with respect to the second plate member 1B and with respect to the adjuster plate member 19. Varying the position of the first plate member 1A with respect to the second plate member 1B allows the user to configure a height of the camber adjustment apparatus 100 to correspond to vehicle wheels of varying size.

Figure 3:
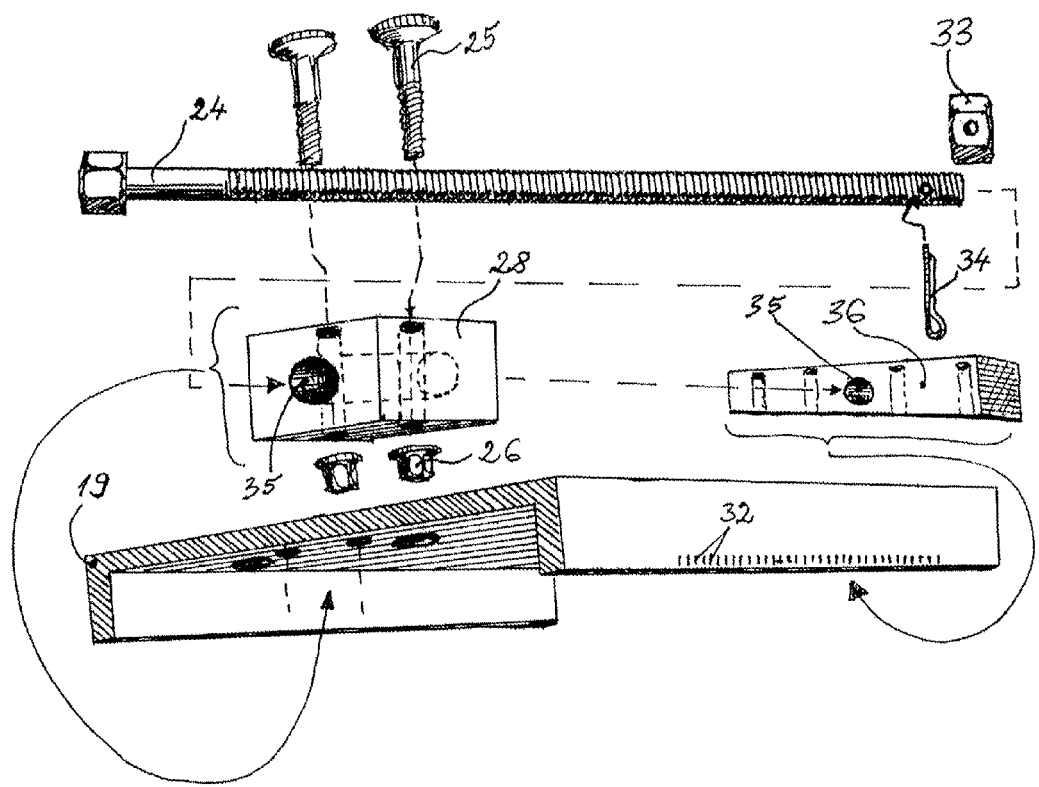
FIG. 3 illustrates an exploded view of an adjuster plate member of the camber adjustment apparatus.

FIG. 3 illustrates an exploded view of an adjuster plate member 19. A top surface of the adjuster plate member 19 is rigidly coupled to a bottom surface of the second plate member 1B. The adjuster plate member 19 is rigidly coupled to each of the front member 9 and the rear member 31 of the second plate member 1B by securing bolts 12 and nuts 13. A length of the securing bolts 12 is disposed in parallel with the surface of the first plate 1A. The second plate member 1B may include gussets 11 machined into each of the front member 9 and the rear member 31 to provide access to the securing bolts 12 and nuts 13.

The adjuster plate member 19 further includes an adjuster bolt 24 extending from a first end of the adjuster plate member 19 to a second end of the adjuster plate member 19. Securing bolts 25 secure and rigidly fix a first adjuster bolt securing member 28 and second adjuster bolt securing member 36 to the first end and the second end, respectively, at the bottom surface of the adjuster plate member 19. When the camber adjustment apparatus 100 is bolted to the wheel hub, the second end of the adjuster plate member 19 is disposed underneath the vehicle. The first adjuster bolt securing member 28 and the second adjuster bolt securing member 36 each have unthreaded holes 35. The adjuster bolt 24 extends through each of the unthreaded holes 35 and is secured to the first adjuster bolt securing member 28 and the second adjuster bolt securing member 36 by nut 33. The nut 33 is secured to the adjuster bolt 24 by a cotter pin 34. A pressure bearing 23 is disposed between the first adjuster bolt securing member 28 and the adjuster bolt 24. The adjuster bolt 24 turns within the unthreaded holes 35. The first adjuster bolt securing member 28 and the second adjuster bolt securing member 36 are secured to the adjuster plate member 19 by the securing bolts 25 and nuts 26.

Figure 4:
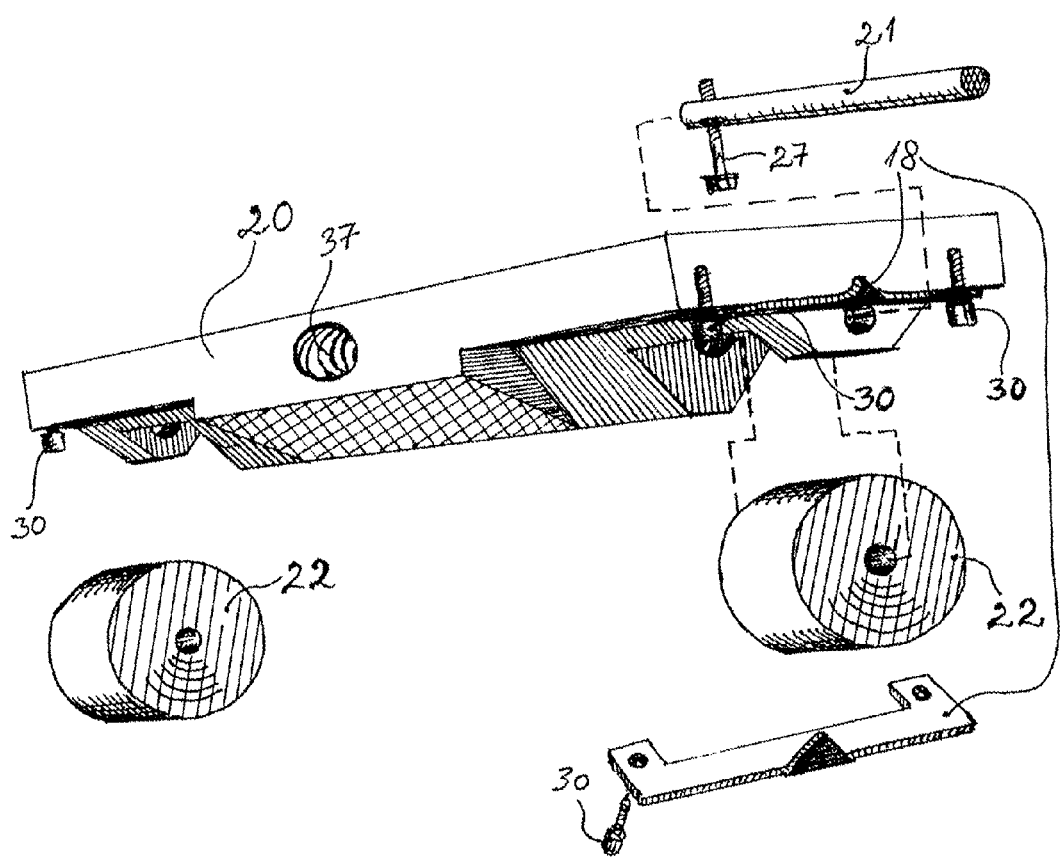
FIG. 4 illustrates an exploded view of an adjusting body of the camber adjustment apparatus.

FIG. 4 illustrates an exploded view of an adjusting body 20. The adjusting body 20 is movably coupled to a bottom surface of the adjuster plate member 19 by the adjuster bolt 24. Reference numbers 14 and 15 illustrate a gap between the adjuster plate member 19 and the adjusting body 20. The adjuster bolt 24 extends through a threaded hole 37 of the adjusting body 20. The adjusting body 20 is disposed between the first adjuster bolt securing member 28 and the second adjuster bolt securing member 36 and moves in parallel to the surface of the adjuster plate member 19. A position of the adjusting body 20 between the first adjuster bolt securing member 28 and the second adjuster bolt securing member 36 is adjusted by rotating the adjuster bolt 24.

For example, as illustrated in FIG. 2, when the adjuster bolt 24 is rotated clockwise, the adjusting body 20 moves in the direction of arrow A, whereas when the adjuster bolt 24 is rotated counter-clockwise, the adjusting body 20 moves in the direction of arrow B. The adjuster bolt 24 may be configured to move the adjusting body 20 in the direction of arrow A when rotated counter-clockwise and in the direction of arrow B when rotated clockwise. Arrow A represents the direction of negative camber and arrow B represents the direction of positive camber for the wheel of the vehicle. Thus, the user rotates the adjuster bolt 24 to adjust the camber adjustment apparatus 100 to a predetermined camber. The adjusting body 20 includes a wheel 22 that contacts a supporting surface, e.g., the ground or floor. The camber adjustment apparatus 100 pivots about the wheel 22 when the adjuster bolt 24 moves the adjusting body between the first end and the second end of the adjuster plate member 19.

Referring to FIG. 4, a wheel assembly includes a wheel axle 21 that rotatably couples a wheel 22 to the adjusting body 20. The wheel axle 21 is secured to the adjusting body 20 by an axle securing screw 27. The adjusting body 20 may include multiple wheels 22. The adjusting body 20 may include a single wheel axle for each wheel that rotatably couples the wheels to the adjusting body 20.

The adjusting body 20 includes an indicator plate 18 rigidly coupled to the adjusting body 20 by securing screws 30. As illustrated in FIG. 1, the wheel assembly has gaps 15, 16, and 17. The gap 15 provides clearance between the adjuster plate member 19 and the adjusting body 20. The gap 16 provides clearance between a sidewall of the adjusting body 20. The gap 17 provides clearance between the indicator plate 18 and a bottom surface of the adjuster plate member 19. The clearance provided by the gaps 15, 16, and 17 allows the adjusting body 20 and the indicator plate 18 to move freely while the adjuster bolt 24 is rotated to adjust the camber adjustment apparatus 100 to the predetermined camber.

The indicator plate 18 includes an indicator and is disposed on the adjusting body 20. The indicator protrudes towards the adjuster plate member 19. A camber measurement scale 32 is disposed on a sidewall of the adjuster plate member 19. The camber measurement scale 32 has numbered lines disposed at equal intervals along a portion of the length of the adjuster plate member 19. The indicator on the indicator plate 18 aligns with the numbered lines of the camber measurement scale 32 and allows the user to determine positioning of the adjusting body 20 with respect the first end and the second end of the adjuster plate member 19. This positioning indicates relative camber of the camber adjustment apparatus 100 to the user and provides the user a point of reference from which to tune the camber of another wheel on the same axle.

Figure 5:
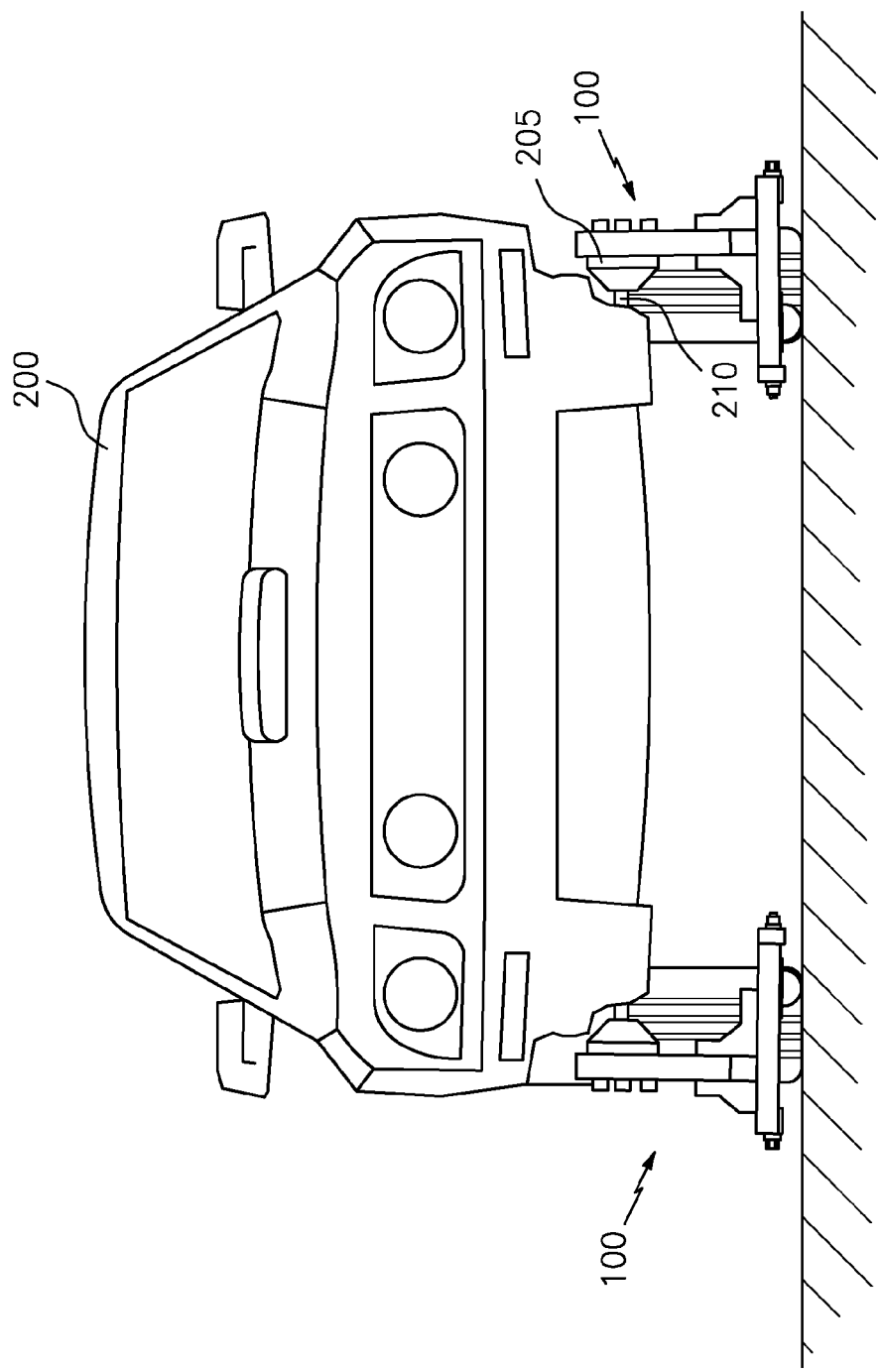
FIG. 5 illustrates the camber adjustment apparatus attached to a vehicle's wheel hub.

FIG. 5 illustrates the camber adjustment apparatus attached to a vehicle's wheel hub. A method of using the camber adjustment apparatus 100 described herein is also provided. When the camber adjustment apparatus 100 is bolted to the wheel hub 205 of the vehicle 200, the user measures camber of the camber adjustment apparatus 100 using a camber measuring instrument. The user then rotates the adjuster bolt 24, adjusting the camber adjustment apparatus 100 towards positive or negative camber, until camber of the camber adjustment apparatus 100 is set to the predetermined camber. For performance vehicles, camber is generally set between 2.5 degrees and 3.5 degrees in the negative direction. For public street vehicles, camber is generally set between 1.5 degrees and 2.0 degrees in the negative direction. As the user rotates the adjuster bolt 24, the adjusting body 20 moves in the direction of arrow A or arrow B depending on the direction the adjuster bolt 24 is rotated. With the wheel 22 being the only component of the camber adjustment apparatus 100 contacting the ground, as the adjusting body 20 is adjusted between the first and second ends of the adjuster plate member 19, camber of the camber adjustment apparatus 100, and therefore wheel hub, is adjusted accordingly.

The indicator plate 18 moves along the camber measurement scale 32 as the adjuster bolt 24 is rotated. Two camber adjustment apparatuses per axle may be used—one for each side of the vehicle's axle 210.

For example, the user may measure the camber of the vehicle's 200 wheels and determine that one of the wheel's needs adjustment while the opposite wheel on the same axel does not need an adjustment. The user then removes the wheel from the wheel hub 210 that does not require camber adjustment and installs a first camber adjustment apparatus in place of the wheel. The user adjusts the first camber adjustment apparatus by rotating the adjuster bolt 24 until obtaining the exact previously determined camber when the wheel was on and records the value of the indicator on the scale 32.

The same operation will be performed on the other wheel of the same axle with a second camber adjustment apparatus. After bolting the second camber adjustment apparatus on the wheel, without previously measuring and recording the wheel camber value, the camber adjustment apparatus is adjusted with the bolt 24 until the indicator on the indicator plate 18 indicates the same value on the scale 32 as recorded on the first camber adjustment apparatus. Now both camber adjustment apparatuses indicate the same value. The user may then tune the suspension without modifying the camber adjustment apparatus. Once the tuning of the suspension is complete, the user removes both camber adjustment apparatuses and reinstalls the wheels. The user again measures the camber of the wheels to ensure the values are the same as they were with the camber adjustment apparatuses bolted on.

Use of the camber adjustment apparatus 100 provides precise alignment of the vehicle's wheels, with errors being less than 0.1 degrees. Additionally, the camber adjustment apparatus 100 provides the user with convenient access to the vehicle's suspension without having to place the vehicle on a hydraulic lift. These attributes make the camber adjustment apparatus 100 particularly useful with performance vehicles.

While embodiments of the invention have been shown and described with reference to certain embodiments thereof, it will be understood by those skilled in the art that various changes in form and details may be made therein without departing from the spirit and scope of the invention as defined by the appended claims and equivalents thereof.

What is claimed is:

1. A camber adjustment apparatus for alignment of a wheel of a vehicle, the apparatus comprising:
   a plate member configured to be bolted to a wheel hub of the vehicle;
   an adjuster plate member coupled to a bottom surface of the plate member and comprising a first end and a second end;
   an adjuster bolt coupled to the first end and the second end of the adjuster plate member; and
   an adjusting body movably coupled to the adjuster bolt and at least partially disposed between the first end and the second end of the adjuster plate member,
   wherein the adjusting body is configured so that rotation of the adjuster bolt moves the adjusting body between the first end and the second end of the adjuster plate member such that the plate member is adjusted to a predetermined camber,
   wherein the adjusting body comprises a wheel that contacts a supporting surface, and
   wherein the camber adjustment apparatus is configured to pivot about the wheel when the adjuster bolt moves the adjusting body between the first end and the second end.

2. The camber adjustment apparatus according to claim 1, wherein the predetermined camber of the plate member is adjusted in a direction of negative or positive camber based on a position of the adjusting body with respect to the first end and the second end of the adjuster plate member.

3. The camber adjustment apparatus according to claim 1, wherein the plate member comprises:
   a first plate member comprising an upper portion, a lower portion, a front surface, and a rear surface; and
   a second plate member coupled to the lower portion of the first plate member comprising a front member, a rear member, and a securing bolt protruding through the front member to the rear member.

4. The camber adjustment apparatus according to claim 3, wherein at least a portion of the first plate member is disposed between the front member and the rear member of the second plate member.

5. The camber adjustment apparatus according to claim 4, wherein the first plate member is adjustably coupled to the front member and the rear member of the second plate member.

6. The camber adjustment apparatus according to claim 3, further comprising at least one lug hole disposed on the upper portion of the first plate member and extending through the front surface and the rear surface of the first plate member.

7. The camber adjustment apparatus according to claim 3, further comprising instrument mounting members disposed on the upper portion of the first plate for removably mounting camber measuring instruments.

8. The camber adjustment apparatus according to claim 1, further comprising a first adjuster bolt securing member coupled to a bottom surface of the first end of the adjuster plate member and a second adjuster bolt securing member coupled to a bottom surface of the second end of the adjuster plate member.

9. The camber adjustment apparatus according to claim 8, wherein the adjuster bolt is rotatably coupled to the first adjuster bolt securing member and the adjuster bolt is rotatably coupled to the second adjuster bolt securing member.

10. The camber adjustment apparatus according to claim 8, wherein the adjusting body is disposed between the first adjuster bolt securing member and the second adjuster bolt securing member.

11. The camber adjustment apparatus according to claim 8, wherein a position of the adjusting body between the first adjuster bolt securing member and the second adjuster bolt securing member is adjusted by rotating the adjuster bolt.

12. A camber adjustment system comprising:
a vehicle comprising at least one wheel hub coupled to an axle;
a camber adjustment apparatus bolted to the wheel hub, the camber adjustment apparatus comprising:
a plate member configured to be bolted to the wheel hub;
an adjuster plate member coupled to a bottom surface of the plate member and comprising a first end and a second end;
an adjuster bolt coupled to the first end and the second end of the adjuster plate member; and
an adjusting body movably coupled to the adjuster bolt and at least partially disposed between the first end and the second end of the adjuster plate member,
wherein the adjusting body is configured so that rotation of the adjuster bolt moves the adjusting body between the first end and the second end of the adjuster plate member such that the plate member is adjusted to a predetermined camber,
wherein the adjusting body comprises a wheel that contacts a supporting surface, and
wherein the camber adjustment apparatus is configured to pivot about the wheel when the adjuster bolt moves the adjusting body between the first end and the second end.

13. The camber adjustment system according to claim 12, wherein the camber adjustment apparatus comprises a first camber adjustment apparatus and a second camber adjustment apparatus coupled to opposite ends of the axle.

14. The camber adjustment system according to claim 12, further comprising an instrument mounted to the plate member for measuring at least one of camber, toe, and caster.

15. The camber adjustment system according to claim 12, wherein the plate member comprises a plurality interchangeable plate members comprising lug holes for mounting the camber adjustment apparatus to the wheel hub, wherein the lug holes comprise at least one of a three, four, five and six hole pattern.

16. A method of adjusting camber of a wheel hub of a vehicle comprising:
providing a camber adjustment apparatus comprising a plate member configured to be bolted to the wheel hub, an adjuster plate member coupled to a bottom surface of the plate member and comprising a first end and a second end, an adjuster bolt coupled to the first end and the second end of the adjuster plate member, and an adjusting body movably coupled to the adjuster bolt and at least partially disposed between the first end and the second end of the adjuster plate member;
securing the camber adjustment apparatus to the wheel hub of the vehicle; and
rotating, in at least one of a clockwise and a counterclockwise direction, the adjuster bolt until the wheel hub of the vehicle is set to a predetermined camber,
wherein the adjusting body comprises a wheel that contacts a supporting surface, and
wherein the camber adjustment apparatus is configured to pivot about the wheel when the adjuster bolt moves the adjusting body between the first end and the second end.

17. The method of adjusting camber according to claim 16, wherein when the adjuster bolt is rotated, the plate member is adjusted in a direction of negative or positive camber based on a position of the adjusting body with respect to the first end and the second end of the adjuster plate member.

18. The method of adjusting camber according to claim 16, further comprising adjusting a position of the plate member with respect to the adjuster plate member such that a height of the camber adjustment apparatus corresponds to a predetermined height of the wheel hub.

19. The method of adjusting camber according to claim 16, further comprising determining relative camber of the camber adjustment apparatus from a camber measurement scale disposed on a sidewall of the adjuster plate member.

* * * * *